(12) United States Patent
Nukui

(10) Patent No.: US 6,436,021 B2
(45) Date of Patent: Aug. 20, 2002

(54) METHOD AND APPARATUS FOR SUPPLYING LUBRICANT

(75) Inventor: Mitsuru Nukui, Toyama (JP)

(73) Assignee: Nippei Toyama Corporation, Tokyo (JP)

( * ) Notice: Subject to any disclaimer, the term of this patent is extended or adjusted under 35 U.S.C. 154(b) by 0 days.

(21) Appl. No.: 09/886,285

(22) Filed: Jun. 22, 2001

(30) Foreign Application Priority Data

Jun. 23, 2000 (JP) ........................................ 2000-189878

(51) Int. Cl.[7] .............................. B23Q 3/157; B23C 9/00
(52) U.S. Cl. .............................. 483/1; 408/56; 409/136; 409/233; 483/13; 184/6.14
(58) Field of Search ................................. 483/1, 13, 31, 483/2; 409/136, 233, 231, 131; 408/56; 184/6.14

(56) References Cited

U.S. PATENT DOCUMENTS

| | | | | |
|---|---|---|---|---|
| 3,645,154 A | * | 2/1972 | Anderson | 451/398 |
| 3,675,519 A | * | 7/1972 | McCullough | 74/822 |
| 4,555,047 A | * | 11/1985 | Ackley | 184/105.1 |
| 4,905,794 A | * | 3/1990 | Sugioka et al. | 184/6.14 |
| 5,193,646 A | * | 3/1993 | Horikawa et al. | 137/883 |
| 5,549,177 A | * | 8/1996 | Hosokawa et al. | 184/104.1 |
| 5,890,849 A | * | 4/1999 | Cselle | 279/20 |
| 6,050,756 A | * | 4/2000 | Buchholz et al. | 137/896 |

FOREIGN PATENT DOCUMENTS

| | | | | |
|---|---|---|---|---|
| FR | 2609921 A1 | * | 7/1988 | 483/1 |
| JP | 11-216639 | * | 8/1999 | 483/13 |

\* cited by examiner

*Primary Examiner*—William Briggs
(74) *Attorney, Agent, or Firm*—Sughrue Mion, PLLC

(57) ABSTRACT

A lubricant supply apparatus 1 includes a tank holder portion 3 and a lubricant tank portion 2. In case where a tool holder clamp device 62 provided on a spindle shaft 61 pushes against an abutting member 35 disposed in the lubricant supply apparatus 1, lubricant filled in a pressure chamber 11 formed in the lubricant supply apparatus 1 can be jetted out from injection holes 39, —formed in the abutting member 35. The thus jetted-out lubricant is supplied to the tool holder clamp device 62.

15 Claims, 10 Drawing Sheets

METHOD AND APPARATUS FOR SUPPLYING LUBRICANT

BACKGROUND OF THE INVENTION

1. Field of the Invention

The present invention relates to a lubricant supply method and a lubricant supply apparatus for supplying a lubricant to a tool holder clamp device provided on a spindle shaft of a machine tool such as a machining center.

2. Description of the Related Art

As a machine tool such as a machining center, there is known a machine tool with a tool automatic change device. The machine tool with the tool automatic change device includes a magazine with a plurality of tools received therein, and one of the tools received in the magazine can be gripped by the tool automatic change device and can be substituted for a tool mounted on a spindle shaft. The tool to be mounted onto the spindle shaft is clamped through a tool holder by a tool holder clamp device provided in the spindle shaft.

In the machine tool of this type, after a given workpiece is machined using a tool mounted on the spindle shaft, the tool is changed with another tool using the tool automatic change device; and, since then, the machining operation of the workpiece is proceeded while automatically changing the tools properly. And, when the machining operation is executed for a given time or by a given number of times, a lubricant is periodically supplied to the tool holder clamp device provided in the spindle shaft.

In the case of supplying the lubricant to the tool holder clamp device, due to the structure of the spindle shaft, it is difficult to supply the lubricant from inside the spindle shaft. For this reason, when supplying the lubricant to the tool holder clamp device, an operator manually supplies the lubricant from the front of the spindle shaft by greasing or by spraying.

However, in the above-mentioned conventional lubricant supply method in which an operator supplies lubricant by hand, there arises a problem that the operator must stop the machine tool each time the lubricant is supplied. Further, for example, in case where the operator omits to supply the lubricant, there arises another problem that the tool holder clamp device occurs an imperfect clamp, to thereby stop the machine tool.

SUMMARY OF THE INVENTION

The present invention aims at eliminating the drawbacks found in the above-mentioned conventional lubricant supply method. Accordingly, it is an object of the invention to provide lubricant supply method and apparatus in which a lubricant can be supplied automatically to thereby be able not only to save the operator's time and labor for supply of the lubricant but also to prevent occurrence of the imperfect clamp caused by the operator's omission to supply the lubricant.

To attain the above object, according to the present invention, there is provided a method for supplying a lubricant in a machine tool, the machine tool including a spindle shaft equipped with a tool holder clamp device in the interior portion thereof and a tool automatic change device for changing a tool mounted on the spindle shaft with a tool stored in a magazine, the tool holder clamp device adapted to clamp a tool holder provided in the too, the method comprising the steps of: inserting a lubricant supply apparatus stored in the magazine to the spindle shaft through the tool automatic change device; and, supplying the lubricant to the tool holder clamp device from the lubricant supply apparatus inserted into the spindle shaft.

Further, there is provided an lubricant supply apparatus for supplying a lubricant in a machine tool, comprising: a lubricant tank filled with the lubricant; a tank holder portion on which the lubricant tank is mounted, the tank holder portion having a holder member adapted to be gripped by a tool automatic change device; and an injection holes supplying the lubricant filled in the lubricant tank to a tool holder clamp device of the spindle shaft, when the lubricant supply apparatus is inserted into a spindle shaft provided in the machine tool.

DETAILED DESCRIPTION OF THE PREFERRED EMBODIMENTS

Now, description will be given below in detail of the preferred embodiments of lubricant supply method and apparatus according to the invention with reference to the accompanying drawings.

Figure 1A:
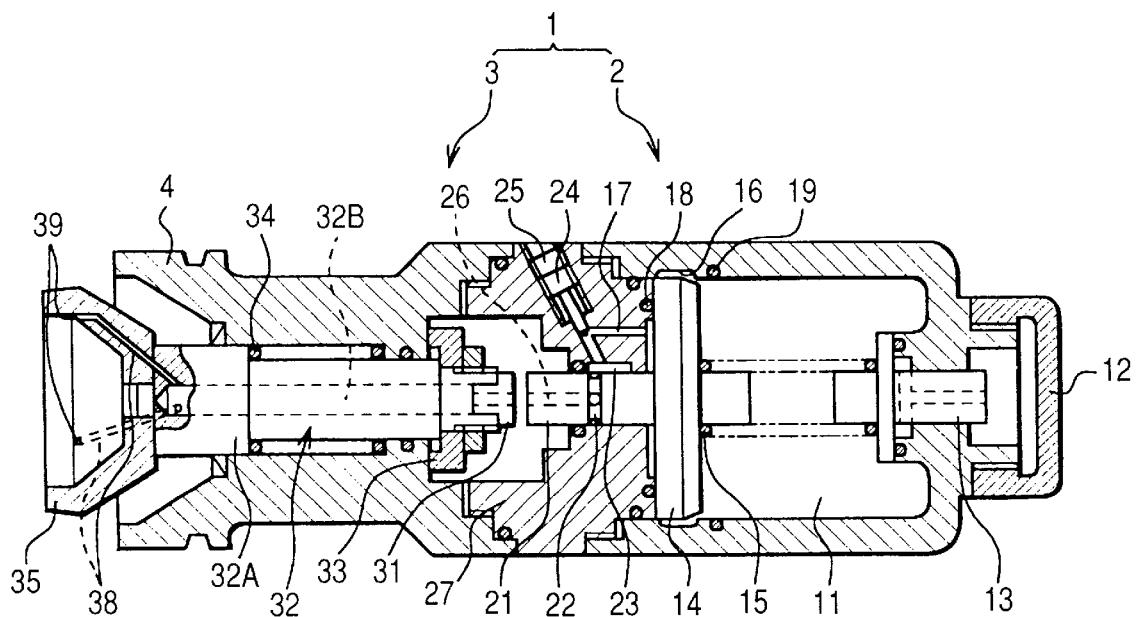
FIG. 1A shows a side section view showing a lubricant supply apparatus according to the invention.
Figure 1B:
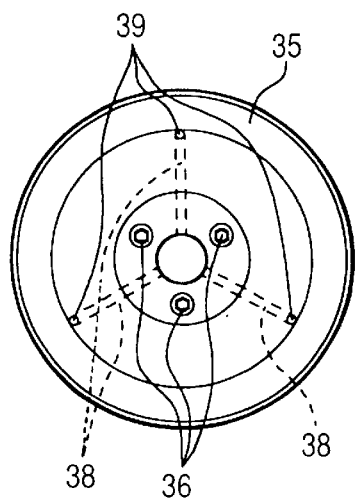
FIG. 1B is a front view showing the lubricant supply apparatus.
Figure 1C:
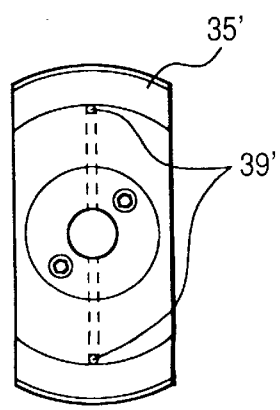
FIG. 1C is a front view showing a modification of the lubricant supply apparatus.

FIGS. 1A to 1C show a lubricant supply apparatus according to the invention: specifically, FIG. 1A is a side section view thereof; FIG. 1B is a front view thereof; and, FIG. 1C is a front view of a modification thereof.

As shown in FIG. 1A, the lubricant supply apparatus 1 according to the invention includes a lubricant tank portion 2 and a tank holder portion 3. In the lubricant tank portion 2, there is formed a pressure chamber 11 which is filled with lubricant and charging gas. On the rear portion (in FIG. 1A, on the right side) of the pressure chamber 11, there is mounted a cap 12; and, a charging valve 13 is located inside the cap 12. When replenishing lubricant in the pressure chamber 11, the cap 12 is opened and the lubricant is then replenished into the pressure chamber 11 through the charging valve 13.

Also, an opening is formed in the front portion of the pressure chamber 11, while the opening is closed by a disk-shaped piston 14 which is movable back and forth. The piston 14 is energized forward by a spring 15 disposed within the pressure chamber 11. Further, in the front-most portion of the pressure chamber 11, a large-diameter annular groove 16 is formed so as to extend along the peripheral edge thereof. And, in the leftward front portion of the piston 14, there is formed an outflow passage 17 through which the lubricant can pass. Also, a small-diameter O-ring 18 is embedded in the front portion of the piston 14 in such a manner that it covers the outer periphery of the entrance portion of the outflow passage 17. Further, a large-diameter O-ring 19 is embedded in the rear portion of the piston 14 in such a manner that the outer peripheral portion of the piston 14 is closely contacted with the large-diameter O-ring 19.

And, when the piston 14 is positioned at its front-most position, the front surface of the piston 14 is closely contacted with the small-diameter O-ring 18 to thereby cut off communication between the large-diameter annular groove 16 and the outflow passage 17, which disables the lubricant from passing between them. Also, in case where the piston 14 is moved backward and the front surface of the piston 14 is thereby separated from the small-diameter O ring 18, not only the large-diameter annular groove 16 and outflow passage 17 are allowed to communicate with each other but also the large-diameter annular groove 16 is allowed to communicate with the pressure chamber 11, so that the lubricant within the pressure chamber 11 is allowed to flow out to the outflow passage 17. Further, in case where the piston 14 moves further backward down to the extreme backward end thereof, the outer peripheral portion of the piston 14 is brought into close contact with the large-diameter O-ring 19 to thereby cut off communication between the pressure chamber 11 and the large-diameter annular groove 16, so that the lubricant is disabled from passing between them.

Now, on the front surface of the piston 14, there is disposed a rod-shaped piston rod 21 in such a manner that it is united with the piston 14 as an integral body. A small-diameter annular groove 22 through which the lubricant is allowed to pass is formed in the substantially central portion of the piston rod 21 in the longitudinal direction thereof. Further, in the piston rod 21, a groove 23 is formed so as to extend along the outer peripheral portion thereof. This groove 23 is in communication with the outflow passage 17 and, therefore, the lubricant, which has flown out to the outflow passage 17 through the large-diameter annular groove 16, is allowed to arrive at the groove 23. And, when the piston 14 is situated at its front-most position, that is, when the piston rod 21 is situated at its front position and also when the piston 21 moves backward, the small-diameter annular groove 22 and the groove 23 are allowed to communicate with each other.

At an intermediate position of the outflow passage 17, a lubricant quantity adjusting valve or an adjustable throttle 24 serving as a lubricant supply quantity adjusting unit is disposed so as to be movable back and forth with respect to a cartridge portion 27 by a screw. By adjusting the forward and backward movements of the lubricant quantity adjusting valve 24, the quantity of the lubricant passing through the outflow passage 17 can be adjusted. A lock plug 25 is disposed at a position in the upper portion of the lubricant quantity adjusting valve 24. After the passing quantity of the lubricant is adjusted by the lubricant quantity adjusting valve 24, sealing agent is applied to the lock plug 25. In the interior portion of the piston rod 21, there is formed a flow passage 26 along the axial direction of the piston rod 21. The flow passage 26 is in communication with the small-diameter annular groove 22. Therefore, while the piston 14 is moving from the front portion of the pressure chamber 11 to the rear portion thereof, that is, the piston rod 21 is moving backward, the lubricant, which has passed through the outflow passage 17, flows through the groove 23 and small-diameter annular groove 22 into the flow passage 26 formed in the piston rod 21.

The lubricant tank portion 2 forms a portion which is located in the rear of the piston rod 21; and, the cartridge portion 27 is disposed in the front end portion of this portion. The cartridge portion 27 is threadedly engaged with a holder member 4 and, due to the cartridge portion 27, the lubricant tank portion 2 can be removed from the tank holder portion 3.

On the other hand, in the interior portion of the tank holder portion 3, there is disposed a seal member 31 which is made of elastic material. The seal member 31 is structured in such a manner that, when the lubricant tank portion 2 is mounted into the tank holder portion 3, the seal member 31 can be positioned in front of the piston rod 21. The front portion of the seal member 31 is fitted into a pushing shaft 32. Also, a stopper 33 is provided in the connecting position between the seal member 31 and pushing shaft 32, while the stopper 33 prevents the forward movements of the seal member 31 and pushing shaft 32. Further, the front portion of the pushing shaft 32 is formed as a large-diameter front portion 32A. The periphery of the pushing shaft 32 forms a space portion, which arranges a spring 34 for energizing the large-diameter front portion 32A of the pushing shaft 32 in the forward direction. Also, in the seal member 31 and pushing shaft 32, a flow passage 32B is formed along the axial direction thereof. The flow passage 32B is formed at a position which, when the seal member 31 and piston rod 21 are contacted with each other, allows the flow passage 32B to communicate with the flow passage 26.

An abutting member 35 is disposed on the front end position of the large-diameter front portion 32A of the pushing shaft 32. The abutting member 35 has a circular shape when it is viewed from the front side thereof, as shown in FIG. 1B. The abutting member 35 is fixed to the large-diameter front portion 32A of the pushing shaft 32 in a fitting manner by mounting bolts 36, 36 and 36. Also, the outer peripheral surface of the abutting member 35 is tapered to narrow backward.

Further, three lubricant supply passages 38, 38, 38 are formed in the abutting member 35 and, the end portions of these three lubricant supply passages 38, 38, 38 are respectively formed as injection holes 39, 39 which can be used as lubricant supply holes. And, when the lubricant tank portion 2 is mounted into the tank holder portion 3, the flow passage 26 formed in the piston rod 21 is allowed to communicate with the flow passage 32B formed in the seal member 31. Also, in case where the abutting member 35 is inserted into a spindle shaft 61 (FIG. 4) of a spindle apparatus 50 (FIG. 4) to thereby push against the spindle shaft 61, the lubricant filled into the lubricant tank portion 2 can be jetted out from the injection holes 39, 39, 39.

In addition, the tank holder portion 3 has a holder member 4 which can be gripped by a tool holder gripper jaw provided in a change arm of in a tool automatic change device. On the other hand, the abutting member 35, as shown in FIG. 1B, has a circular shape when it is viewed from the front surface side thereof. However, a modification of the abutting member 35 is also possible. For example, as shown in FIG. 1C, there can also be employed a modified abutting member 35' with two injection holes 39', 39' having a shape which is obtained by cutting away the two side portions of a circular shape.

Further, in case where the lubricant filled in the pressure chamber 11 is used and is thereby reduced in the quantity thereof or is thereby consumed (used up), the lubricant can be replenished through the charging valve 13 by opening the cap 12. Also, the lubricant tank portion 2 itself can be changed with a new one by removing the lubricant tank portion 2 from the tank holder portion 3.

Next, description will be given below of a machining center which is a machine tool to be used in a lubricant supply method according to the invention.

Figure 2:
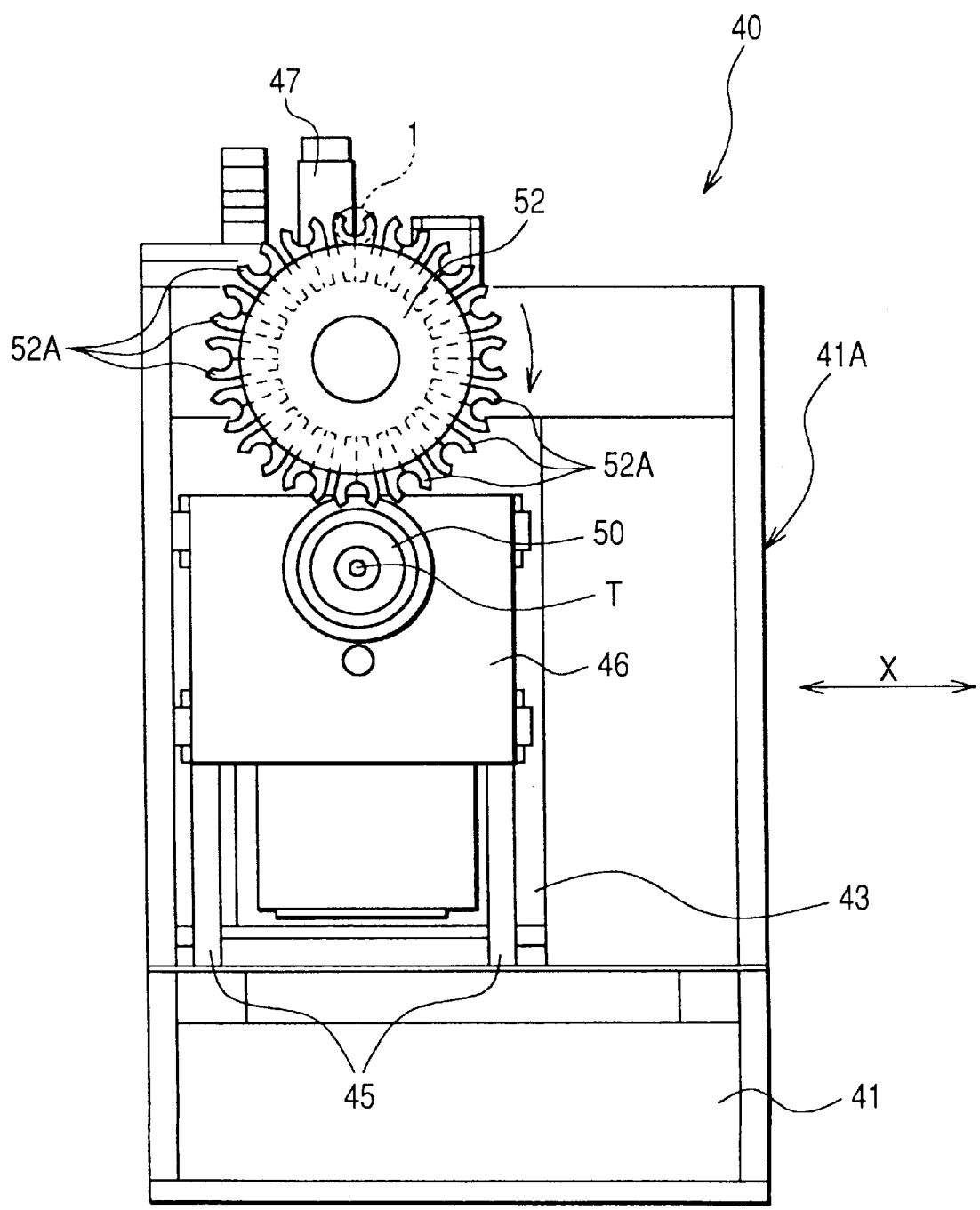
FIG. 2 is a front view of a machining center used to execute a lubricant supply method according to the invention.
Figure 3:
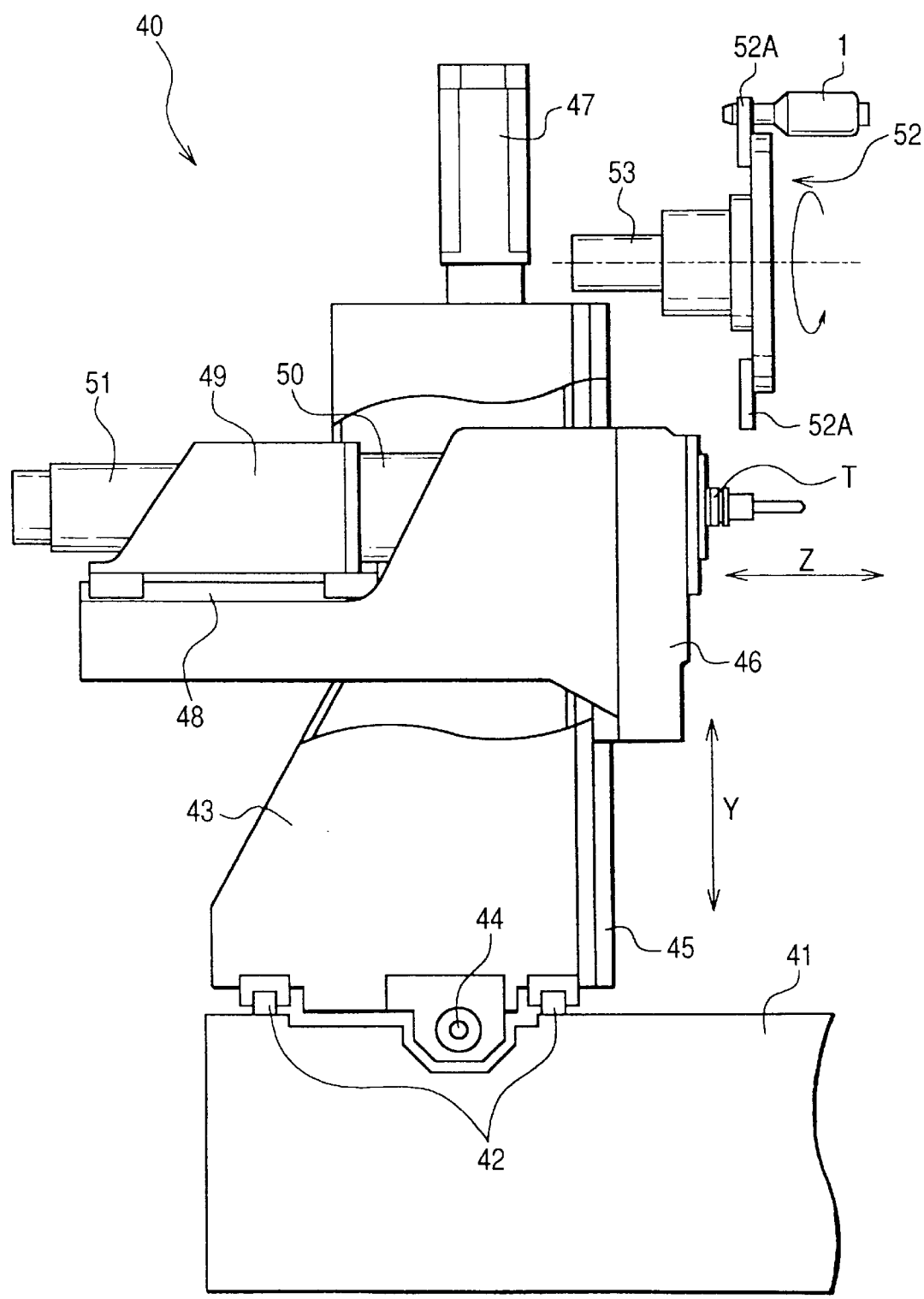
FIG. 3 is a side view of a machining center used to execute the lubricant supply method.

FIG. 2 is a front view of a machining center for carrying out a lubricant supply method according to the invention, and FIG. 3 is a side view of the present machining center.

As shown in FIGS. 2 and 3, the machining center 40 has a base 41. Two X-axis guide rails 42, 42 which respectively extend in the right and left direction (the X-axis direction) are disposed on the upper surface of the base 41; and, a column 43 is disposed on the X-axis guide rails 42, 42. The column 43 is structured to move on the X-axis guide rails 42, 42 along the X-axis direction, in case where an X-axis motor (not shown) is driven to thereby rotate an X-axis ball screw 44 shown in FIG. 3.

Y-axis guide rails 45, 45 which extend in the vertical direction (the Y-axis direction) are fixed to the front surface of the column 43; and, a first saddle 46 is mounted on the Y-axis guide rails 45, 45. The first saddle 46 is structured to move in the Y-axis direction, in case where a Y-axis motor 47 is driven to thereby rotate a Y-axis ball screw (not shown).

Further, a Z-axis guide rail 48 which extends in the back-and-forth direction (the Z-axis direction) is disposed on the upper portion of the first saddle 46; and, a second saddle 49 is disposed on the upper portion of the Z-axis guide rail 48. The second saddle 49 is structured to move in the Z-axis direction, in case where a Z-axis motor (not shown) is driven to thereby rotate a Z-axis ball screw (not shown). Also, the second saddle 49 includes a spindle apparatus 50 and a spindle motor 51 is arranged in the rear of the spindle apparatus 50. And, the spindle apparatus 50 can be moved in any of the X-axis direction, Y-axis direction and Z-axis direction in accordance with the movements of the column 43, first saddle 46 and second saddle 49. The structure of the spindle apparatus 50 will be discussed later.

Above the spindle apparatus 50, there is disposed a tool magazine 52 of a disk-type supported on a frame 41A which is erected in the upward direction from the two ends of the base 41. In the present embodiment, the tool magazine 52 functions as a tool automatic change device. The tool magazine 52, as shown in FIG. 2, includes a plurality of tool holder gripper jaws 52A, 52A, ———; and, proper tool holders T and lubricant supply devices 1 are gripped by and stored in the tool holder gripper jaws 52A, 52A, ———, respectively. By the way, FIG. 3 shows a state where a lubricant supply device 1 is stored in one of the tool holder gripper jaws 52A of the tool magazine 52. Also, a tool magazine index motor 53 is disposed in the rear portion of the tool magazine 52 and, the tool magazine index motor 53 is driven to rotate the tool magazine 52.

On the other hand, the X-axis motor (not shown), Y-axis motor 47, Z-axis motor (not shown), spindle motor 51, and tool magazine index motor 53 are all connected to a control unit (not shown) and thus, in accordance with control signals output from the control unit, the rotation directions and rotation quantities thereof can be controlled.

Next, description will be given below of the structure of the spindle apparatus 50.

Figure 4:
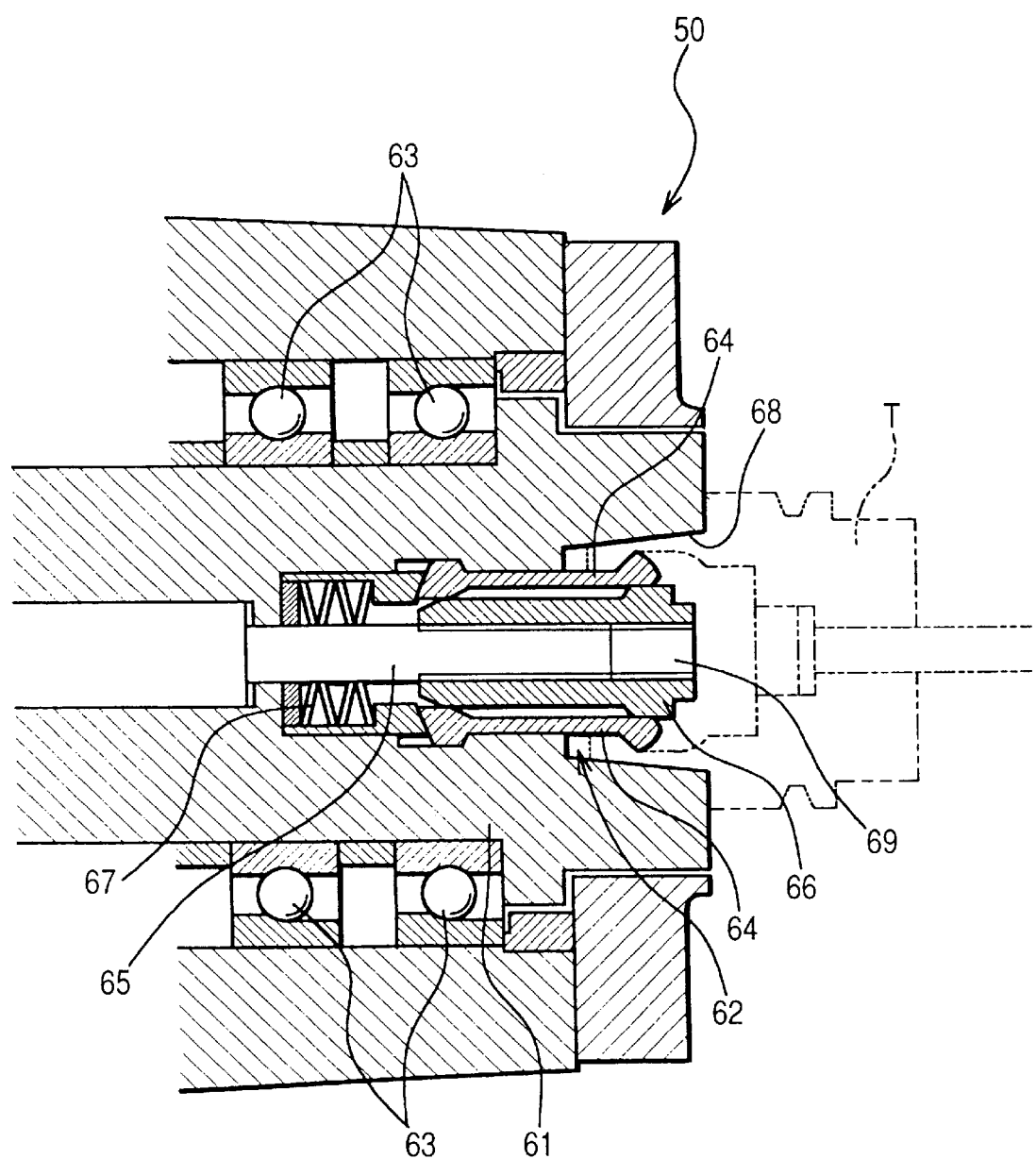
FIG. 4 is a side section view of a spindle apparatus provided in the machining center.

As shown in FIG. 4, the spindle apparatus 50 includes the spindle shaft 61 and a tool holder clamp device 62 disposed in the front portion of the spindle shaft 61. The spindle shaft 61 can be rotated by the spindle motor 51 shown in FIG. 3. Bearings 63, 63 are disposed on the periphery of the spindle shaft 61, for holding the spindle shaft 61 in a freely rotatable manner.

Also, the tool holder clamp device 62 includes a plurality of collets 64, 64, ——— and a collet actuator 66. The rear end portion (in FIG. 4, on the right side) of the collet actuator 66 is threadedly engaged with a draw bar 65. Coned disk springs 67 are disposed on the rear portion of each collet 64 and also the leading end portion of the collet 64 is projected up to the taper hole 68 of the spindle shaft 61. Also, a lock nut 69 is disposed on the leading end portion of the collet actuator 66.

Figure 8:
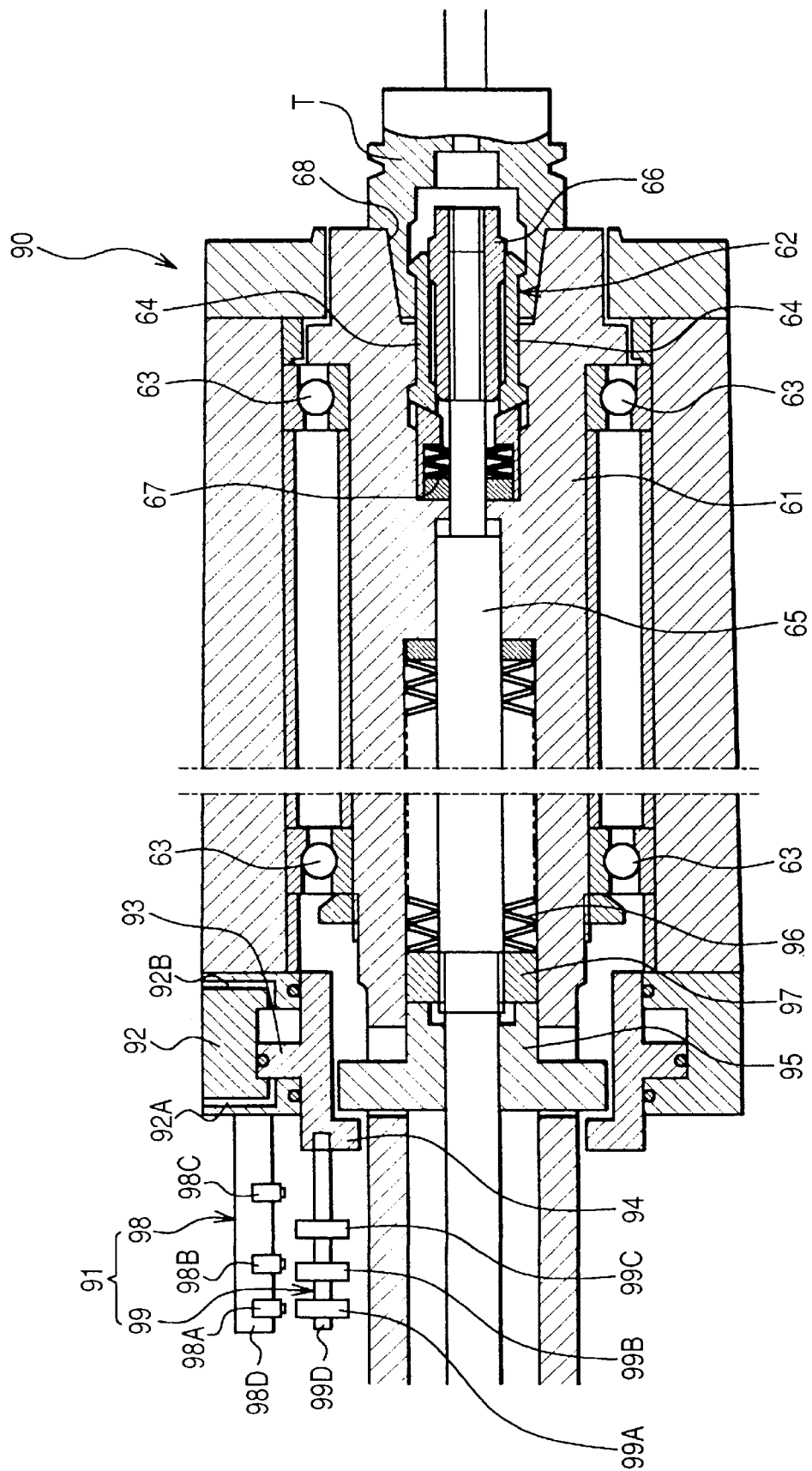
FIG. 8 is a side section view of a spindle apparatus of a machining center used in a lubricant supply method according to a third embodiment of the invention.

And, after a tool holder T substituted by the tool automatic change device and shown by a virtual line in FIG. 4 is inserted into the taper hole 68, in case where the draw bar 65 is pulled using series array of coned disk springs 96 shown in FIG. 8, the tool holder T is held and clamped by and between the collets 64 and taper hole 68. In this state, the spindle shaft 61 is rotated by the spindle motor 51 shown in FIG. 3 to thereby machine a workpiece (not shown). After completion of the machining operation, to remove the tool holder T from the taper hole 68, the draw bar 65 may be pushed out. That is, in case where the draw bar 65 is pushed out, due to the operations of the collet actuator 66 and coned disk springs 67, the collets 64, 64, ——— are pushed out and thus the leading end portions thereof are contracted inwardly to thereby form spaces between the collets 64, 64, ——— and the taper hole 68, so that the tool holder T can be unclamped. Thus, the tool holder T can be removed easily.

Also, the taper hole 68 is tapered to widen in the forward direction in such a manner as to have the same inclination as the taper formed in the outer peripheral surface of the abutting member 35 employed in the lubricant supply apparatus 1 shown in FIG. 1. Thanks to this, the outer periphery of the abutting member 35 can be inserted into the inner surface of the taper hole 68.

Now, description will be given below of a lubricant supply method according to the invention.

Figure 5:
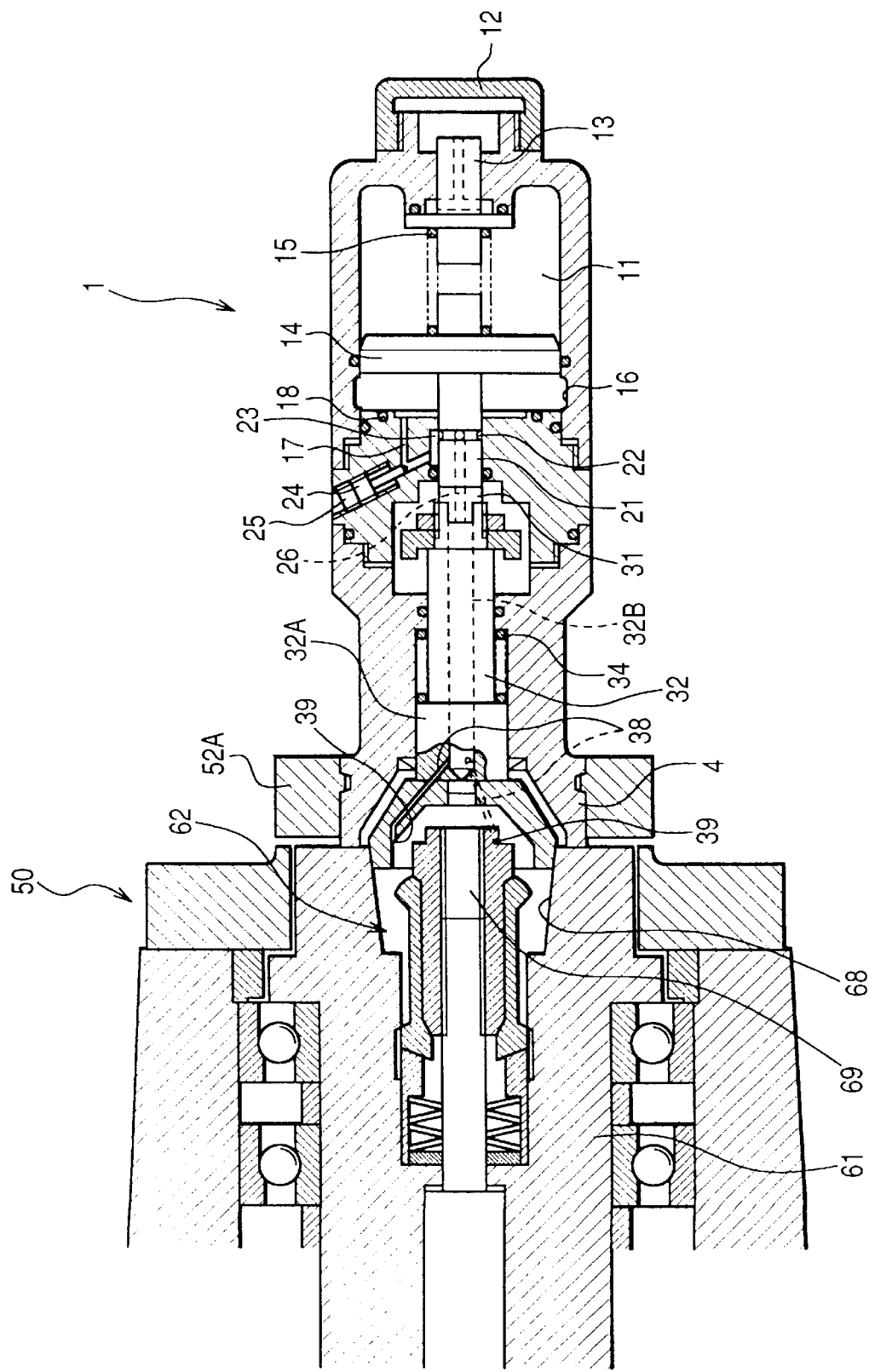
FIG. 5 is a side section view of a first embodiment of a lubricant supply apparatus according to the invention, showing a state thereof where it supplies lubricant to a tool holder clamp device.

In the lubricant supply method according to the invention, as shown in FIG. 5, lubricant is supplied to the tool holder clamp device 62. While the workpiece is being machined, as shown in FIG. 4, the tool holder T shown by the virtual line is clamped by the tool holder clamp device 62. And, in a state where the tool holder T is thus clamped, the workpiece is machined by a tool. When machining the workpiece, in order to mount a tool suitable for machining onto the tool holder clamp device 62, tool change is carried out. The procedure for such tool change is as follows.

Firstly, the tool magazine 52 shown in FIG. 2 is rotated by the tool magazine index motor 53 in such a manner that the tool holder gripper jaw 52A not gripping the lubricant supply apparatus 1 nor a tool can be situated at the lowest position. Secondly, the column 43 is moved by the X-axis motor (not shown) to thereby locate the spindle shaft 61 just below of the tool holder gripper jaw 52A situated at the lowest position. Thirdly, the first saddle 46 is moved upward by the Y-axis motor 47 so that the holder member of the tool holder T is inserted into and gripped by the tool holder gripper jaw 52A. After then, the tool holder T is unclamped using the tool holder clamp device 62 shown in FIG. 9; and, not only the second saddle 49 but also the spindle shaft 61 of the spindle apparatus 50 are moved backward using the Z-axis motor (not shown), thereby separating the tool holder T from the spindle apparatus 50.

Next, the tool magazine 52 is rotated by the tool magazine index motor 53 to thereby index a tool specified for use in the next step and then move it down to the lowest position. Then, the second saddle 49 as well as the spindle shaft 61 of the spindle apparatus 50 are moved forward by the Z-axis motor (not shown) to thereby insert a new tool into the spindle apparatus 50. And, the tool holder T is clamped by the tool holder clamp device 62 and, after then, a predetermined machining operation is started.

After these steps have been executed a given number of times, the lubricant is supplied to the tool holder clamp device 62. Description will be given below of the step of supplying the lubricant. Firstly, similarly to the case of change of the tool mounted on the spindle shaft 61 of the spindle apparatus 50, the tool magazine 52 is rotated such that the tool holder gripper jaw 52A gripping nothing can be situated at the lowest position. Secondly, the first saddle 46 is moved upward by the Y-axis motor 47, so that the holder member of the tool holder T is inserted into and gripped by the tool holder gripper jaw 52A. After then, the draw bar 65 is pushed out and the tool holder T is unclamped using the tool holder clamp device 62; and, the second saddle 49 and the spindle shaft 61 of the spindle apparatus 50 are moved backward using the Z-axis motor (not shown), thereby separating the tool holder T from the spindle apparatus 50.

Next, the tool magazine 52 is rotated by the tool magazine index motor 53 such that the tool holder gripper jaw 52A gripping the lubricant supply apparatus 1 is situated at the lowest position. After the tool holder gripper jaw 52A gripping the lubricant supply apparatus 1 is situated at the lowest position and the tank holder portion 3 of the lubricant supply apparatus 1 is disposed opposed to the spindle shaft 61, the second saddle 49 as well as the spindle shaft 61 of the spindle apparatus 50 are moved forward by the Z-axis motor (not shown). In case where the spindle shaft 61 is moved forward, as shown in FIG. 5, the abutting member 35 disposed on the front portion of the lubricant supply apparatus 1 is engaged with the taper hole 68 formed in the front portion of the spindle shaft 61 and further, due to the forward movement of the spindle shaft 61, the abutting member 35 is pressed by the clamp portion of the spindle shaft 61 and is thereby moved back to the right. Then, a part of the lubricant supply apparatus 1 including the injection holes 39, ——— is inserted into the tool holder clamp device 62 in the spindle shaft 61, so that the injection holes 39, ——— are disposed at positions which are opposed to the tool holder clamp device 62. By the way, the holder member 4 of the lubricant supply apparatus 1 still remains gripped by the tool holder gripper jaw 52A.

In case where the abutting member 35 is moved back, the pushing shaft 32 is also moved back to the right against the energizing force of the spring 32. With the backward movement of the pushing shaft 32, the piston rod 21 and the piston 14 are moved back against the energizing force of the spring 15 by the seal member 31. Then, due to the backward movement of the piston 14, the front surface of the piston 14 is separated from the small-diameter O-ring 18. Thus, the pressure chamber 11 is allowed to communicate with the large-diameter annular groove 16, so that the lubricant within the pressure chamber 11 is flowed out into the large-diameter annular groove 16 due to the pressure within the pressure chamber 11. The lubricant, which has flown into the large-diameter annular groove 16, flows as it is through the outflow passage 17 and the groove 23 into the flow passage 26 of the piston rod 21.

While the piston rod 21 and piston 14 are held in the retreated position, the seal member 31 and the piston rod 21 are in contact with each other, while the flow passage 26 of the piston rod 21 is in communication with the flow passage 32B formed so as to extend from the seal member 31 to the pushing shaft 32. Accordingly, the lubricant flowing into the flow passage 26, as it is, can be jetted out from the injection holes 39, ——— through the lubricant supply passages 38, ———. Then, since the tool holder clamp device 62 is disposed in front of the injection holes 39, ———, the lubricant jetted out from the injection holes 39, ——— can be supplied to the tool holder clamp device 62. The quantity of the lubricant to be jetted out from the injection holes 39, ——— can be properly adjusted by adjusting the opening angle of the lubricant quantity adjusting valve 24 disposed at the intermediate position of the outflow passage 17.

Then, when the piston 14 is moved back up to the extreme end, the outer peripheral portion of the piston 14 is closely contacted with the large-diameter O-ring 19 to thereby be able to provide the lubricant from moving between the pressure chamber 11 and large-diameter annular groove 16. This prevents the lubricant from arriving at the injection holes 39, ———, so that the supply of the lubricant from the injection holes 39, ——— is stopped.

On the other hand, when the spindle apparatus 50 is moved backward, the abutting member 35 is set free from the pressure of the spindle shaft 61. When the pressure applied to the abutting member 35 is removed therefrom, the pushing shaft 32 and seal member 31 are moved forward due to the energizing force of the spring 34. With the forward movement of the seal member 31, the piston rod 21 and piston 14 are released from the pressure given by the pushing shaft 32. Onto the piston rod 21 and piston 14 that are set free from the pressure of the pushing shaft 32, there is applied the energizing force of the spring 15. The energizing force of the spring 15 causes the piston 14 to move forward. During this process, in case where the piston 14 is separated from the large-diameter O-ring 19, the pressure chamber 11 and large-diameter annular groove 16 are allowed to communicate with each other, so that the lubricant can be jetted out from the injection holes 39, ——— again. In this manner, the lubricant can be positively supplied to the tool holder clamp device 62. And, when the piston 14 is moved up to the extreme front end, the front surface of the piston 14 is abutted with the small-diameter O-ring 18 to thereby stop the supply of the lubricant, which terminates the supply of the lubricant.

When the supply of the lubricant is terminated, the machining operation using a given tool is resumed. In the resumption of the machining operation, the tool magazine 52 is rotated by the tool magazine index motor 53 to thereby index the specified tool for use in the next step and move it to the lowest position. Further, the spindle apparatus 50 is moved forward together with the second saddle 49 by the Z-axis motor (not shown) and the new tool is inserted into the spindle apparatus 50. Then, the tool holder clamp device 62 clamps the tool holder T and a given machining operation is started.

The tool change is executed a given number of times; and, the above supply of the lubricant is to be carried out for each tool change.

Next, description will be given below of a lubricant supply apparatus according to a second embodiment of the invention with reference to FIG. 6. By the way, in the present embodiment, since there is used a machining center 40 which is similar to the first embodiment, the same parts are given the same designations and thus the description thereof is omitted.

Figure 6:
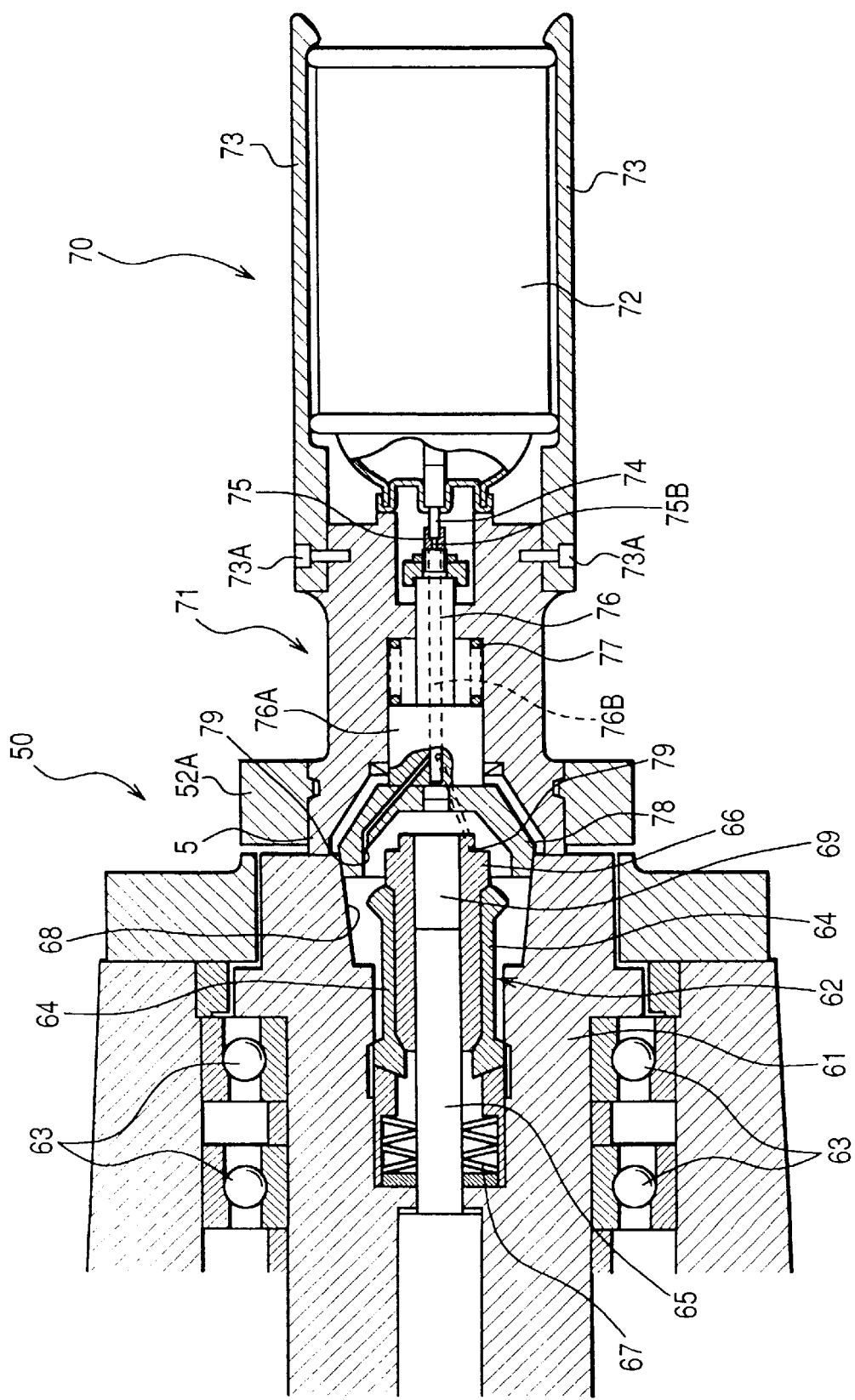
FIG. 6 is a side section view of a lubricant supply apparatus according to a second embodiment of the invention.

As shown in FIG. 6, a lubricant supply apparatus 70 according the second embodiment of the invention comprises a tank holder portion 71; and, a sealed can 72, which is used as a lubricant tank, is to be mounted onto the tank holder portion 71. A plurality of hold jaws 73, 73, ——— are respectively fixed to the rear portion (in FIG. 6, the right side) of the tank holder portion 71 by bolts 73A, 73A, ———, in such a manner as to be disposed at regular intervals in the peripheral direction of the tank holder portion 71. In FIG. 6, only two of these hold jaws 73 are shown. These hold jaws 73, 73, ——— are respectively elastically formed to cooperatively hold the sealed can 72. As the sealed can 72, for example, there can be used a commercially available aerosol can.

A nozzle 74 is disposed on the projecting end of the sealed can 72, and thus, by pushing against the nozzle 74, the lubricant stored within the sealed can 72 can be jetted out from the nozzle 74. A seal member 75 is fitted into the leading end portion of the nozzle 74. In the periphery of a pushing shaft 76, there is formed a space portion receiving a spring 77, and the spring 77 energizes the large-diameter front portion 76A of the pushing shaft 76 in the forward direction. Further, flow passages 75B and 76B are respectively formed in the seal member 75 and pushing shaft 76. These flow passages 75B and 76B are structured to communicate with each other when the seal member 75 is contacted with the pushing shaft 76.

Further, on the front end portion of the pushing shaft 76, there is mounted an abutting member 78 which can be moved back and forth. The abutting member 78 has the same shape as the abutting member 35 used in the lubricant supply apparatus 1 shown in the first embodiment. And, when the abutting member 78 is moved backward, the seal member 75 is also moved backward to thereby be able to push against the nozzle 74. In the abutting member 78, there are formed injection holes 79, 79, 79 (in FIG. 6, only two of them are shown) which are similar to those shown in the first embodiment. The injection holes 79, ——— are in communication with the flow passage 76B and thus the lubricant supplied through the flow passage 76B and thus the lubricant supplied through the flow passage 76B can be jetted out from the injection holes 79, ———. Further, the tank holder portion 71 has a holder member 5 which can be gripped by a tool holder gripper jaw 52A provided in the change arm of a tool automatic change device.

In addition, similarly to the lubricant supply apparatus 1 shown in the first embodiment, the lubricant supply apparatus 70 according to the second embodiment jets out the lubricant from the injection holes 79, ——— by pushing against the abutting member 78. That is, when a spindle shaft 61 is moved forward to push against the abutting member 78, the pushing shaft 76 is moved backward. In case where the pushing shaft 76 is moved backward, it is contacted with the seal member 75 and thus the nozzle 74 is pushed into the sealed can 72 through the seal member 75, so that the lubricant filled in the sealed can 72 can be jetted out from the nozzle 74. The lubricant jetted out from the nozzle 74 passes through the flow passages 75B and 76B and arrives at the injection holes 79, ———, formed in the abutting member 78 so that the lubricant can be jetted out from the injection holes 79, ———. On the other hand, in case where the spindle shaft 61 is moved backward, the large-diameter front portion 76A of the pushing shaft 76 is energized by the spring 77 and thus the pushing shaft 76 is also moved forward. In case where the pushing shaft 76 is moved forward, the nozzle 74 with the seal member 75 fitted thereinto is relieved of the pressure, to thereby stop the jet-out of the lubricant.

Also, as described before, in the first and second embodiments, as the tool automatic change device of the machining center which executes a lubricant supply method according to the invention, there is used the tool magazine of a disk type. However, according to the invention, it is also possible to use another type of tool automatic change device.

Figure 7:
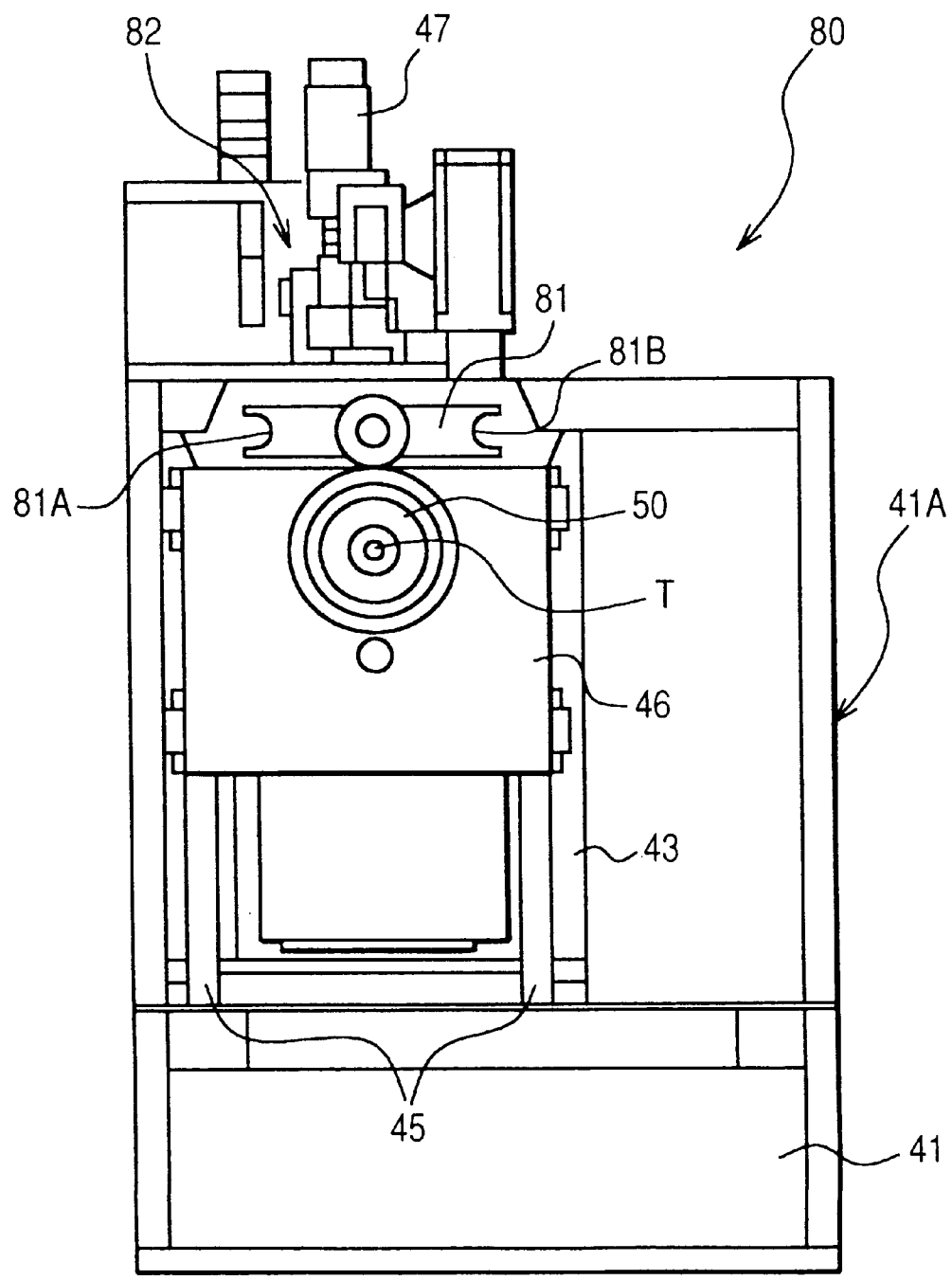
FIG. 7 is a front view of a machining center using a tool change arm as a tool automatic change device.

Now, FIG. 7 is a front view of a machining center which uses a tool change arm as a tool automatic change device. In a machining center 80 shown in FIG. 7, a base 41, a column 43, a first saddle 56 and a second saddle 49 are the same in structure as those in the machining center 40 shown in FIGS. 2 and 3. Therefore, they are given the same designations and thus the description thereof is omitted here.

As shown in FIG. 7, the machining center 80 includes a tool change arm 81. The tool change arm 81 includes, in the two end portions thereof, a first grip portion 81A and a second grip portion 81B, which grip a too holder. Further, a tool transporting device 82 is disposed on the upper portion of the tool change arm 81. The tool transporting device 82 is used to transport a tool stored in a linear magazine (not shown) disposed in the rear portion of the machining center 80, up to the position of the tool change arm 81. As a lubricant supply apparatus, both of lubricant supply apparatus 1 shown in FIG. 1 and the lubricant supply apparatus 70 shown in FIG. 6 can be applied.

Now, description will be given below of a lubricant supply method in the machining center 80 including the above-mentioned tool change arm 81 with reference to FIGS. 3, 5 and 7.

Prior to supply the lubricant, a suitable tool holder T is clamped by the spindle shaft 61 and a proper machining operation is executed. Next, when supplying the lubricant, the rotation of the spindle shaft 61 is stopped and the column 43 is moved in the X-axis direction so that the spindle shaft 61 is moved to a position just below the tool change arm 81. At the same time, the tool change arm 81 is rotated by 90° so that the second grip portion 81B is positioned so as to open downward. Then, the first grip portion 81A grips the holder member 4 of the lubricant supply apparatus 1.

Next, the spindle shaft 61 of the spindle apparatus 50 is moved upward together with the first saddle 46, so that the tool holder T is inserted into the gripped by the second grip portion 81B of the tool change arm 81. After the tool holder T is gripped by the second grip portion 81B, with the tool holder T unclamped, the spindle shaft 61 of the spindle apparatus 50 is moved backward together with the first saddle 46. After then, the tool change arm 81 is rotated by 180°. When the tool change arm 81 is rotated by 180°, the lubricant supply apparatus 1 gripped by the first grip portion 81A is situated in front of the spindle shaft 61, while the tool holder T gripped by the second grip portion 81B is positioned in front of the tool transporting device 82. In this state, the spindle shaft 61 of the spindle apparatus 50 is moved forward together with the second saddle 49 to thereby insert the lubricant supply apparatus 1 into the spindle shaft 61. After the lubricant supply apparatus 1 is inserted into the spindle shaft 61, the lubricant is supplied to the tool holder clamp device 62. The procedure for supplying the lubricant is the same as in the previously described embodiment and thus the description thereof is omitted here.

On the other hand, the tool holder gripped by the second grip portion 81B is changed with another tool holder stored in the linear magazine (not shown) during supply of the lubricant. In this manner, since the tool holder can be changed with another tool holder during supply of the lubricant, the whole cycle time can be reduced.

After supply of the lubricant is executed by the lubricant supply apparatus 1 gripped by the first grip portion 81a and change of the tool holder T gripped by the second grip portion 81B with a new tool holder T is completed, the spindle shaft 61 of the spindle apparatus 50 is moved backward together with the second saddle 49. Next, the tool change arm 81 is rotated by 180°, so that the tool holder T held by the second grip portion 81B is positioned in front of the spindle shaft 61 and the first grip portion 81A is positioned in front of the tool transporting device 82.

After the tool holder T gripped by the second grip portion 81B is positioned in front of the spindle shaft 61, the spindle shaft 61 of the spindle apparatus 50 is moved forward together with the second saddle 49, so that the tool holder T is clamped by the tool holder clamp device 62. At the same time, the lubricant supply apparatus 1 gripped by the first grip portion 81A is transported to and stored into the linear magazine by the tool transporting device 82. After the tool hole T is clamped by the tool holder clamp device 62 and the lubricant supply apparatus 1 is moved to the tool transporting device 82, the tool change arm 81 is rotated by 90°, whereby, as shown in FIG. 7, the tool change arm 81 is arranged in such a manner that the longitudinal direction thereof faces in the horizontal direction. Next, the first saddle 46 is moved downward and the column 43 is moved in the X-axis direction and, after then, the machining operation of the workpiece (not shown) is resumed.

By the way, although the tool change arm 81 according to the embodiment cannot move back and forth, in the case of a tool change arm which is able to move back and forth, instead of the step of moving the spindle apparatus 50 back and forth, the tool change arm can be moved back and forth. In this case, the forward movement of the spindle apparatus 50 corresponds to the backward movement of the tool change arm; and, the backward movement of the spindle apparatus 50 corresponds to the forward movement of the tool change arm.

Next, description will be given below of a lubricant supply method according to a third embodiment of the invention.

FIG. 8 is a side section view of a spindle apparatus provided in a machining center used in the third embodiment. Of the component members of a spindle apparatus 90 shown in FIG. 8, the same members are those shown in FIG. 4 are given the same designations and thus the description thereof is omitted properly.

As shown in FIG. 8, in the spindle apparatus 90 of the machining center used in the present embodiment, there is disposed a clamp detect device 91 detecting the clamped or unclamped condition of a tool holder T in a tool holder clamp device 62. Also, an unclamp cylinder 92 is disposed on the spindle apparatus 90. The unclamp cylinder 92 includes an unclamp pressure oil passage 92A and a clamp pressure oil passage 92B. And, an unclamp piston 93 is fitted into the unclamp cylinder 92. A pushing member 94 is integrally formed with the unclamp piston 93 on the rear end portion of the unclamp piston 93. The pushing member 94 is structured to push out an abutting member 95 abutting with a nut 97 which is screwed into the rear end portion of the draw bar 65. Also, a space portion is formed in the periphery of the draw bar 65; and, coned disk springs 96 are received in the space portion, which energizes the draw bar 65 through the nut 97 screwed into the rear end portion of a draw bar 65.

When unclamping the tool holder T by the tool holder clamp device 62, hydraulic fluid is supplied to the unclamp pressure oil passage 92A to thereby move the unclamp piston 93 forward and then push out the abutting member 95 by the pushing member 94. The thus pushed-out abutting member 95 as it is moves forward to thereby push out the draw bar 65 through the nut 97. This releases the clamped condition of the tool holder clamp device 62.

On the other hand, when clamping the tool holder T, hydraulic fluid is supplied to the clamp pressure oil passage 92B to thereby move the unclamp piston 93 backward. Due to the backward movement of the unclamp piston 93, the abutting member 95 and draw bar 65 are relieved of the push-out force given by the pushing member 94. When the push-out force is relieved, the draw bar 65 is moved backward due to the energizing force of the coned disk springs 96. Due to the backward movement of the draw bar 65, the tool holder T is clamped by the tool holder clamp device 62.

The clamp detect device 91 includes a switch apparatus 98 and a dog member 99. The switch apparatus 98 includes a piston backward-movement limit detect switch 98A, a clamp detect switch 98B, and an unclamp detect switch 98C. These detect switches are arranged in this order from the rear portion of the clamp detect device 91 and are respectively fixed to a connecting member 98D. The leading end portion of the connecting member 98D is fixed to the unclamp cylinder 92. The dog member 99 includes a piston backward-movement limit detect dog 99A, a clamp detect dog 99B, and an unclamp detect dog 99C. These detect dogs are arranged in this order from the rear portion of the clamp detect device 91 and are respectively fixed to a connecting member 99D. The leading end portion of the connecting member 99D is fixedly mounted on the pushing member 94 which is formed integral with the unclamp piston 93.

In case where the tool holder T is not present on the tool holder clamp device 62 and the draw bar 65 is moved back to the extreme end, the piston backward-movement limit detect switch 98A detects the piston backward-movement limit detect dog 99A. In case where the tool holder T is clamped by the tool holder clamp device 62 and the draw bar 65 is slightly moved forward, the clamp detect switch 98B detects the clamp detect dog 99B. Further, in case where the tool holder T is present on the tool holder clamp device 62 but the tool holder T is caught and is thereby held in the unclamped condition, the unclamp detect switch 98C detects the unclamp detect dog 99C.

Now, description will be given below of a lubricant supply method according to the present embodiment.

The machining operation of the workpiece proceeds while changing the tools sequentially. But, each time the tool is changed, the clamp detect device 91 detects the clamped or unclamped condition of the tool holder T in the tool holder clamp device 62. When the tool holder T is properly clamped in the tool holder clamp device 62, the machining operation as it is may be continued.

On the other hand, in case where the tool holder T is not clamped in the tool holder clamp device 62 and the clamp detect device 91 detects the unclamped condition, the lubricant can be supplied to the tool holder clamp device 62. However, the unclamped condition may also be caused, for example, by the imperfect mounting of the tool holder T. Further, excessively frequent supply of the lubricant impairs the operating rate of the machining center. Therefore, the tool holder T is clamped again in the tool holder clamp device 62 and, after then, the clamped or unclamped condition of the tool holder T is decided by the clamp detect device 91. Consequently, when the tool holder T is properly clamped in the tool holder clamp device 62, the machining operation is started. However, when it is detected again that the tool holder T is unclamped, the tool holder T should be clamped again and, after then, the clamped or unclamped condition of the tool holder T should be detected by the clamp detect device 91. As a result of the detection, when the tool holder T is properly clamped in the tool holder clamp device 62, the machining operation of the workpiece may be continued. On the other hand, in case where, for example, the unclamped condition is detected despite of the third clamping operation, it should be judged that the tool holder clamp device 62 is short of lubricant. Thus, using the lubricant supply apparatus 1, lubricant should be supplied to the tool holder clamp device 62.

By the way, according to the present embodiment, when the unclamped condition is detected three consecutive times, the lubricant is supplied to the tool holder clamp device 62. However, the invention is not limited to the present embodiment but, according to the invention, it is also possible to employ an embodiment in which, for the first detection of the unclamped condition, the lubricant is supplied to the tool holder clamp device 62. Further, it is also possible to employ another embodiment in which, when the unclamped condition is detected two or more times, for example, two times or four times consecutively, the lubricant should be supplied to the tool holder clamp device 62. Further, as shown in the respective embodiments, there can be employed the following embodiment that, when the tools are changed a given number of times, the lubricant is supplied; and, detection of the unclamped condition is carried out as auxiliary means and, in the case of the unclamped condition, the lubricant is supplied auxiliarily.

Next, description will be given below of a fourth embodiment of a lubricant supply apparatus according to the invention.

Figure 9:
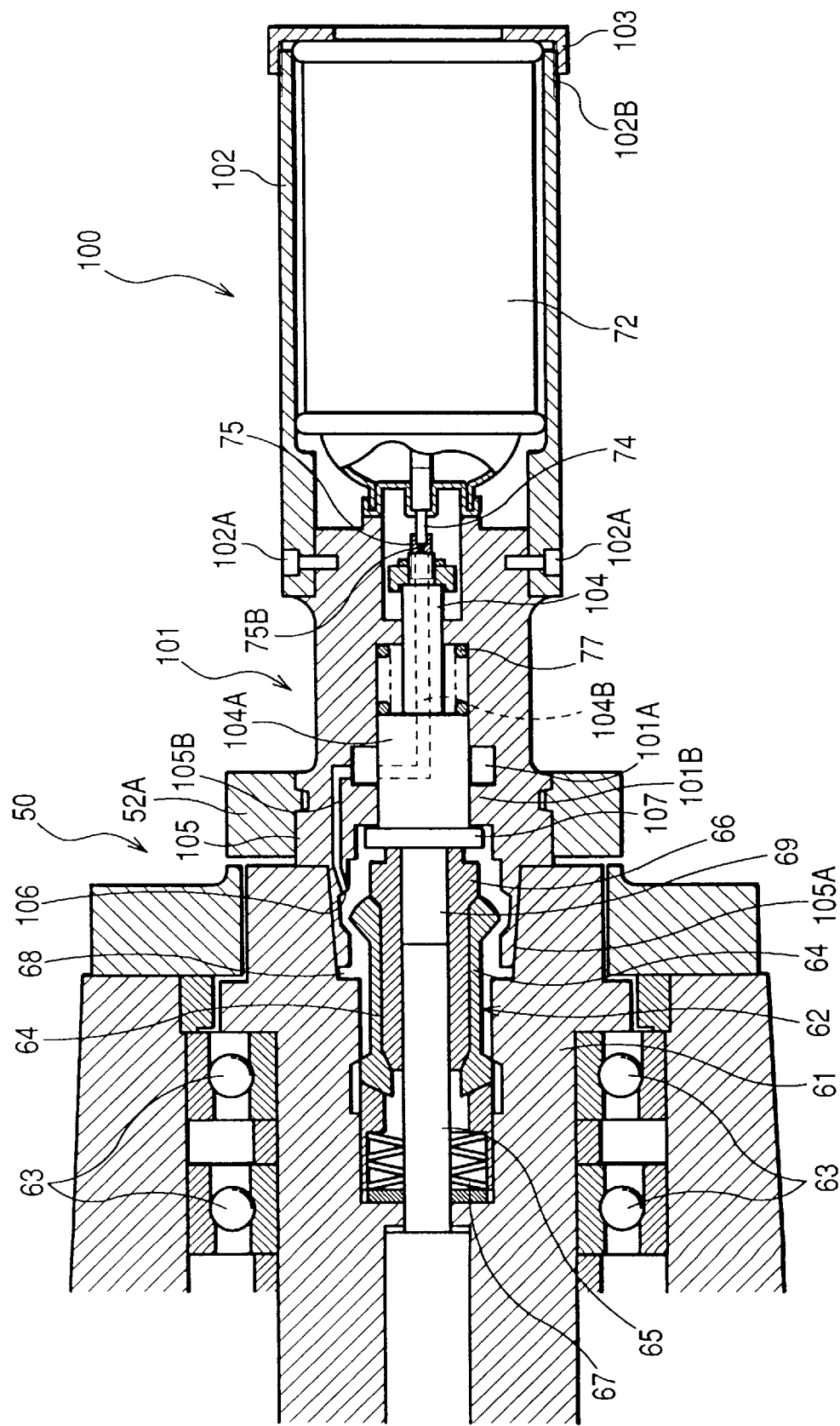
FIG. 9 is a side section view of a lubricant supply apparatus according to a fourth embodiment of the invention, showing its unclamped state; and, FIG. 10 is a side section view of a lubricant supply apparatus according to the fourth embodiment of the invention, showing its clamped state.
Figure 10:
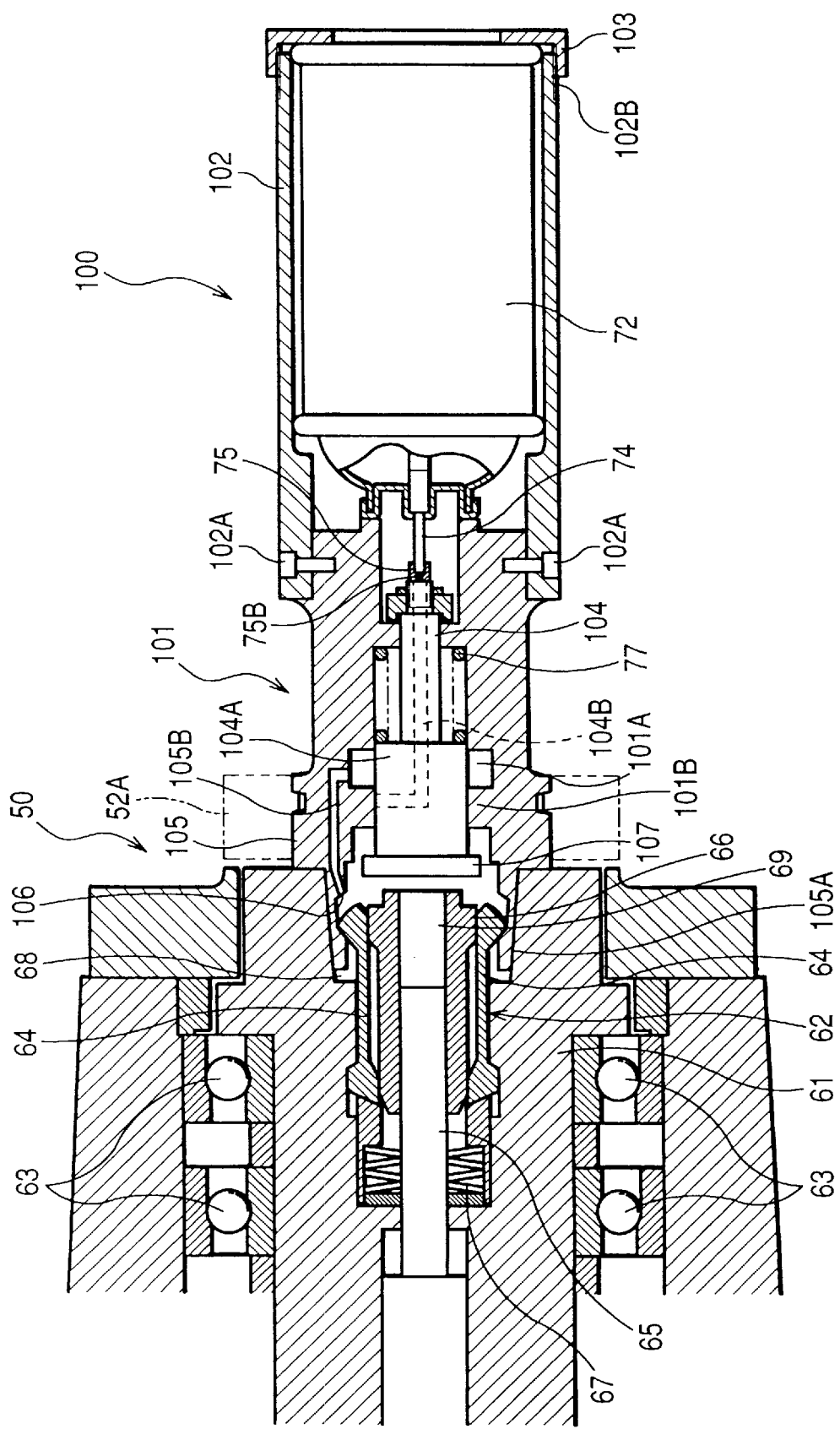

Here, FIG. 9 is a side section view of a lubricant supply apparatus according to the fourth embodiment of the invention, showing its unclamped state; and, FIG. 10 is a side section view of a lubricant supply apparatus according to the fourth embodiment of the invention, showing its clamped state. By the way, in the present embodiment, the same parts thereof as those employed in the previously described second embodiment shown in FIG. 6 are given the same designations and thus the description thereof is simplified here.

As shown in FIG. 9, a lubricant supply apparatus 100 according to the present embodiment includes a tank holder portion 101, while a cylinder body 102, into which a sealed can 72 can be inserted, is fixed to the rear portion (in FIG. 9, the right side portion) of the tank holder portion 101 by two bolts 102A, 102A. Threaded portions 102B are formed in the rear portion of the cylinder body 102 and, when a cap 103 is screwed into the threaded portion 102B, the sealed can 72 can be fastened to the interior portion of the cylinder body 102 by the cap 103.

In the tank holder portion 101, more specifically, at positions thereof where the tank holder portion 101 can be fitted with the large-diameter front portion 104A of a pushing shaft 104, there are formed a groove 101A which extend along the peripheral direction of the tank holder portion 101. Further, shaft guide portions 101B are formed at positions of the tank holder portion 101 which are present on the left side of the a groove 101A. In the large-diameter front portion 104A, there is formed a flow passage 104B which is curved from the horizontal direction to the diameter direction. While the pushing shaft 104 is moved to and held on the right side, the flow passage 104B is allowed to communicate with the groove 101A, so that the flow passage 104B is held in a lubricant supply state. Also, while the pushing shaft 104 is moved to and held on the left side, the flow passage 104B is opposed to the shaft guide portion 101B and the exit portion of the flow passage 104B is thereby closed by the shaft guide portion 101B, so that the flow passage 104B is held in a lubricant non-supply state.

Therefore, when the pushing shaft 104 is moved to the right side, the lubricant supply apparatus 100 is switched over to a lubricant supply state. And, in this state, the lubricant stored within the sealed can 71 is allowed to flow into the groove 101A formed in the tank holder portion 101 through a nozzle 74, a flow passage 75B formed in a seal member 75, and the flow passage 104B formed in the pushing shaft 104. Also, when the pushing shaft 104 is moved to the left side, the lubricant supply apparatus 100 is turned into a lubricant non-supply state. And, in this state, the lubricant stored within the sealed can 72 is prevented from flowing out therefrom.

Also, a holder member 105 is formed in the front portion of the tank holder portion 101. The holder member 105 can be gripped by the tool holder gripper jaws 52A of the tool magazine 52 (FIG. 2). In the front portion of the holder member 105, there is formed a hollow-shank 105A which can be fitted with the taper hole 68 of a spindle shaft 61. A plurality of injection holes 106 are formed in the hollow-shank 105A at positions where the lubricant can be contacted with the peripheries of collets 64. Also, a flow passage 105B which allows the groove 101A and injection holes 106 to communicate with each other, is formed in the holder member 105.

Also, an abutting member 107 is disposed on the front end portion of the pushing shaft 104. And, when the abutting member 107 is pushed, the pushing shaft 104 is moved back in the right direction to thereby turn the lubricant supply apparatus 100 into the lubricant supply state, so that the flow passage 104B is allowed to communicate with the groove 101A and thus the lubricant can be jetted out from the injection hole 106, 106, ———. Further, when the pushed state of the abutting member 107 is removed, the pushing shaft 104 is moved forward due to the expansion of a spring 77 to thereby switch the lubricant supply apparatus 100 over to the lubricant non-supply state, so that the jetting-out of the lubricant from the injection holes 106, 106, ——— is caused to stop.

The above-structured lubricant supply apparatus 100 operates in the following manner.

Firstly, as a draw bar 65 disposed in the spindle shaft 61 moves back and forth in the axial direction thereof, the projections of the collets 64 for clamping the inside-diameter portion of the taper portion of a tool for machining are opened and closed in the diameter direction by the collet actuator 66. The back-and-forth movements of the draw bar 65 are executed by drive means such as an unclamp cylinder 92 shown in FIG. 8. That is, when the draw bar 65 is moved in the right direction in FIG. 9, the tool can be unclamped.

In such unclamped state, the lubricant supply apparatus 100, which is to be substituted for the tool, is pulled out from a tool magazine 52 in a state where the lubricant supply apparatus 100 is gripped by tool holder gripper jaws 52A, and is then inserted into the spindle shaft 61 in such a manner that the hollow-shank 105A can be fitted with the taper hole 68 of the spindle shaft 61. Due to this inserting operation, the leading ends of the collet actuators 66, which have moved in the right direction and have been waiting there, are respectively contacted with the abutting member 107 and are further moved back in the right direction against the spring 77, so that the lubricant filled into the sealed can 72 is allowed to flow through the seal member 75 and flow passages 75B, 104B and arrive at the groove 101A. Further, the lubricant passes through the flow passage 105B of the holder member 105 and is then jetted out from the injection holes 106, 106, ——— onto the taper hole 68.

Next, as shown in FIG. 10, in case where the draw bar 65 is moved in the left direction by the drive means such as the unclamp cylinder 92, the collet actuator 66 enter the interior portions of the collets 64 to bring the projections of the collets 64 into contact with the inside diameter of the hollow-shank 105A, so that the lubricant supply apparatus 100 is clamped by the spindle shaft 61. In this state, the leading ends of the collet actuator 66 are respectively separated from the abutting member 107 and thus the abutting member 107 can be moved in the left direction due to the force of the spring 77. At this time, the lubricant supply apparatus 100 is switched over to the lubricant non-supply state, while the exit portion of the flow passage 104B is opposed to and closed by the shaft guide portion 101B. This prevents the lubricant from being filled into the groove 101A from the flow passage 104B and, therefore, the jetting-out of the lubricant from the injection holes 106, 106, ——— is caused to stop.

As described above, by unclamping the lubricant supply apparatus 100, the lubricant supply apparatus 100 can be switched over to the lubricant supply state and thus the lubricant can be jetted out. Further, by clamping the lubricant supply apparatus 100, the lubricant supply apparatus 100 can be switched over to the lubricant supply state and thus the jetting-out of the lubricant can be stopped. And, by repeating the unclamped and clamped states, the jetting-out of the lubricant and stop of the jetting-out of the lubricant can be repeated. At the same time, the opening and closing operations of the collets 64 and collet actuator 66 of the tool holder clamp device are executed repeatedly, which can promote fit between these parts and lubricant. In this manner, the poor clamping operation possibly caused by chip and rust can be prevented positively. By the way, due to the fact that the lubricant supply apparatus 100 is gripped by the tool holder gripper jaws 52A, the lubricant jetting-out and stop of the lubricant jetting-out by the lubricant supply apparatus 100 through the unclamping operation and clamping operation can also be reversed.

Although description has been given heretofore of the preferred embodiments of the invention, the invention is not limited to these embodiments. For example, as the tool holder clamp device, there can be employed another type of tool holder clamp device such as a double-surface restrict type or a pull stud type.

As has been described hereinbefore, according to a first aspect of the invention, in a machine tool including a spindle shaft incorporating a tool holder clamp device in the interior portion thereof and a tool automatic change device for replacing a tool mounted on the spindle shaft with a tool stored in a magazine, there is provided a method for supplying lubricant to the tool holder clamp device, wherein a lubricant supply apparatus stored in the magazine is inserted into the spindle shaft by the tool automatic change device; and, the lubricant is supplied from the lubricant supply apparatus inserted into the spindle shaft to the tool holder clamp device.

With use of the lubricant supply method according to the first aspect of the invention, a lubricant supply operation can be executed automatically by the tool automatic change device which is used to change a tool in a machine tool. This not only can save the operator's time and labor for supply of the lubricant but also can prevent occurrence of the poor clamped condition caused by the operator's omission to supply the lubricant.

According to a second aspect of the invention, in the lubricant supply method according to the first aspect of the invention, a tool holder is clamped by the tool holder clamp device and tool change is executed a given number of times; after then, a tool holder clamped by the tool holder clamp device is changed with the lubricant supply apparatus and lubricant is supplied from the lubricant supply apparatus to the tool holder clamp device; and, from then, the above steps are executed repeatedly.

With use of the lubricant supply method according to the second aspect of the invention, in case where the tool change is carried out a given number of times an thus the tool holder clamp device is operated using these tools to thereby consume the lubricant, the lubricant is supplied. This makes it possible to replenish the lubricant properly when it is required.

According to a third aspect of the invention, in the lubricant supply method according to the first aspect of the invention, there is disposed a clamp detect device for detecting the clamped or unclamped condition of the tool holder in the tool holder clamp device; the tool holder clamp device carries out its clamping operation a given number of times consecutively; and, in the clamping operation, in case where the clamp detect device detects consecutively that the tool holder is not clamped but is unclamped, the lubricant is supplied from the lubricant supply apparatus to the tool holder clamp device.

The unclamped condition to the tool holder can be caused not only by a lack of the lubricant but also by a simple clamping error. It is not necessary to supply the lubricant. In view of this, in the lubricant supply method according to the third aspect of the invention, the tool holder clamp device carries out its clamping operation a given number of times consecutively and, in the clamping operation, in case where the clamp detect device detects consecutively that the tool holder is not clamped but is unclamped, the lubricant is supplied to the tool holder clamp device. That is, in case where the unclamped condition is detected a given number of times consecutively, it can be judged that the tool holder clamp device is running short of the lubricant; and, therefore, the lubricant can be replenished at a more suitable timing.

According to a fourth aspect of the invention, in the lubricant supply method according to the first aspect of the invention, the lubricant supply apparatus is structured such as to switch over between a lubricant supply state and a lubricant non-supply state by the unclamp operation and the clamp operation of the tool holder clamp device, and by repeating the clamp and unclamp operations of the lubricant supply apparatus by the tool holder clamp device, the supply of the lubricant to tool holder clamp device and the stop of the supply are performed repeatedly.

With use of the lubricant supply method according to the fourth aspect of the invention, by simple repeating the clamp and unclamp operations in a machine tool, the supply of the lubricant from the lubricant supply apparatus and the stop of the supply are performed repeatedly. Thus, with a simple operation, the supply and the stop of the lubricant are performed.

According to a fifth aspect of the invention, in the lubricant supply method according to the first aspect of the invention, the tool automatic change device includes a tool change arm having first and second grip portions respectively for gripping a tool holder; the tool holder is mounted into the spindle shaft and a workpiece is machined; after then, the tool holder mounted into the spindle shaft is gripped by one of the first and second grip portions and the lubricant supply apparatus is gripped by the other; and, while lubricant is being supplied from the lubricant supply apparatus to the tool holder clamp device, the tool holder gripped by one of the first and second grip portions is changed with another tool holder.

With use of the lubricant supply method according to the fifth aspect of the invention, during supply of the lubricant, the change of the tool holder can be executed. Due to this, the machining operation can be executed efficiently, which can contribute toward shortening the whole cycle time.

According to a sixth aspect of the invention, there is provided a lubricant supply apparatus for supplying lubricant, comprising: a lubricant tank filled with lubricant; a tank holder portion with the lubricant tank mounted therein; a holder member grippable by a tool automatic change device; and injection holes from which, when the lubricant supply apparatus is inserted into a spindle shaft provided in a machine tool, the lubricant filled in the lubricant tank can be supplied to a tool holder clamp device in the spindle shaft.

According to the sixth aspect of the invention, there can be provided a lubricant supply apparatus which can supply lubricant to the tool holder clamp device using the tool automatic change device.

According to a seventh aspect of the invention, in the lubricant supply apparatus according to the sixth aspect of the invention, an abutting member is disposed in the tank holder portion and, in case where the abutting member is pressed against the spindle shaft, lubricant filled in the lubricant tank can be jetted out from the injection holes.

With use of the lubricant supply apparatus according to the seventh aspect of the invention, due to provision of the abutting member, in case where the spindle shaft is moved forward to thereby push against the abutting member, the lubricant can be jetted out from the injection holes. This eliminates the need for separate provision of a switch member used to start supply of the lubricant, which makes it possible to simplify the structure of the lubricant supply apparatus accordingly.

According to an eighth aspect of the invention, in the lubricant supply apparatus according to the sixth aspect of the invention, the injection holes are formed in the holder member.

With use of the lubricant supply apparatus according to the eight aspect of the invention, since the injection holes for injecting the lubricant are formed in said holder member, the lubricant is positively supplied to the tool holder clamp device.

According to a seventh aspect of the invention, in the lubricant supply apparatus according to the sixth aspect of the invention, there is further included a lubricant supply quantity adjusting unit for adjusting the quantity of lubricant to be jetted out from the injection holes.

In the lubricant supply apparatus according to the seventh aspect of the invention, there is included the lubricant supply quantity adjusting unit. Thanks to this, the supply quantity of lubricant can be adjusted according to the size of tool holder clamp means or the lubricant supply time.

According to an eighth aspect of the invention, in the lubricant supply apparatus according to the sixth aspects of the invention, the lubricant tank is removably mounted in the tank holder portion and can be changed with another lubricant tank.

In the lubricant supply apparatus according to the eighth aspect of the invention, since the lubricant tank is removably mounted, in case where the lubricant filled in the lubricant tank is consumed, the lubricant tank can be changed with a new lubricant tank.

According to a ninth aspect of the invention, in the lubricant supply apparatus according to the sixth aspect of the invention, the lubricant can be filled into the lubricant tank.

In the lubricant supply apparatus according to the ninth aspect of the invention, in case where the lubricant stored in the lubricant tank is consumed, lubricant can be replenished.

What is claimed is:

1. A method for supplying a lubricant in a machine tool, said machine tool including a spindle shaft equipped with a tool holder clamp device in the interior portion thereof and a tool automatic change device for changing a tool mounted on said spindle shaft with a tool stored in a magazine, said tool holder clamp device adapted to clamp a tool holder provided in said tool, said method comprising the steps of:

inserting a lubricant supply apparatus stored in said magazine to said spindle shaft through said tool automatic change device; and, supplying the lubricant to said tool holder clamp device from said lubricant supply apparatus inserted into said spindle shaft.

2. The lubricant supply method according to claim 1, further comprising the steps of:

changing said tool mounted on said spindle shaft with said lubricant supply apparatus, wherein said changing, inserting and supplying steps are performed after the change of said tools is executed by a predetermined number of times.

3. The lubricant supply method according to claim 1, wherein said machine tool includes a clamp detect device for detecting the clamped or unclamped condition of said tool holder in said tool holder clamp device, and upon executing a clamping operation of said tool holder, when said clamp detect device detects consecutively the unclamped condition without detecting the clamped condition, the lubricant is supplied from said lubricant supply apparatus to said tool holder clamp device.

4. The lubricant supply method according to claim 1, further comprising the step of:

stopping the supply of the lubricant to said tool holder clamp device while inserting said lubricant supply apparatus to said spindle shaft, wherein said supplying and stopping steps are switched over in accordance with the switching of the unclamp operation and the clamp operation of said tool holder clamp device.

5. The lubricant supply method according to claim 1, further comprising the steps of:

preparing, as said tool automatic change device, a tool change arm having first and second grip portions respectively for gripping said tool holder;

gripping said tool holder mounted on said spindle shaft by one of said first and second grip portions while gripping said lubricant supply apparatus by the other; and, changing said tool holder gripped by one of said first and second grip portions with another tool holder during said supplying step.

6. The lubricant supply method according to claim 1, wherein said inserting step is performed by a relatively movement of said spindle shaft and said lubricant supply apparatus.

7. The lubricant supply method according to claim 1, wherein said lubricant supply apparatus includes a lubricant tank filled with the lubricant and injection holes supplying the lubricant to said tool holder clamp device, and wherein said inserting step establishes a communication between said lubricant tank and said injection holes.

8. A lubricant supply apparatus for supplying a lubricant in a machine tool, comprising:

a lubricant tank filled with the lubricant;

a tank holder portion on which said lubricant tank is mounted, said tank holder portion having a holder member adapted to be gripped by a tool automatic change device; and injection holes supplying the lubricant filled in said lubricant tank to a tool holder clamp device of said spindle shaft, when said lubricant supply apparatus is inserted into a spindle shaft provided in the machine tool.

9. The lubricant supply apparatus according to claim 8, wherein said tank holder portion further includes an abutting member relatively movable to said holder member, and when said abutting member is pressed by said spindle shaft, the lubricant filled in said lubricant tank is jetted out from said injection holes.

10. The lubricant supply apparatus according to claim 8, wherein said injection holes are formed in said holder member.

11. The lubricant supply apparatus according to claim 10, wherein said holder member has a hollow-shank taper adapted to be inserted into a taper hole formed in said spindle shaft, and said injection holes are formed in said tapered portion of said holder member.

12. The lubricant supply apparatus according to claim 8, further comprising:

a lubricant supply quantity adjusting unit for adjusting the quantity of the lubricant to be jetted out from said injection holes.

13. The lubricant supply apparatus according to claim 8, wherein said lubricant tank is removable from said tank holder portion, to thereby be changeable with another lubricant tank.

14. The lubricant supply apparatus according to claim 8, wherein said lubricant tank is structured so that the lubricant is filled therein.

15. The lubricant supply apparatus according to claim 9, wherein said tank holder portion further comprises a shaft attached to said abutting member and having a flow passage communicating with said injection holes formed in said abutting member, said shaft being disposed in said holder member to be movable with respect to said holder member together with said abutting member, and when said abutting member is pressed by said spindle shaft, the lubricant filled in said lubricant tank is jetted out from said injection holes through said flow passage of said shaft.

* * * * *